(12) United States Patent
Robinson, Jr. et al.

(10) Patent No.: US 11,487,821 B2
(45) Date of Patent: Nov. 1, 2022

(54) SYSTEMS AND METHODS FOR PROCESSING RETAIL FACILITY-RELATED INFORMATION REQUESTS OF RETAIL FACILITY WORKERS

(71) Applicant: Walmart Apollo, LLC, Bentonville, AR (US)

(72) Inventors: William Craig Robinson, Jr., Centerton, AR (US); Dong T. Nguyen, Wylie, TX (US); Mekhala M. Vithala, Irving, TX (US); Makeshwaran Sampath, Irving, TX (US); Spencer S. Seeger, Bentonville, AR (US); Bahula Bosetti, Rogers, AR (US); Praneeth Gubbala, Irving, TX (US); Songshan Li, Austin, TX (US); Santosh Kumar Kurashetty, Richardson, TX (US); Srihari Attuluri, Irving, TX (US); Venkata Maguluri, Irving, TX (US); Lindsay S. Leftwich, Bentonville, AR (US); George E. Loring, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 273 days.

(21) Appl. No.: 16/862,939

(22) Filed: Apr. 30, 2020

(65) Prior Publication Data
US 2020/0349200 A1 Nov. 5, 2020

Related U.S. Application Data

(60) Provisional application No. 62/840,991, filed on Apr. 30, 2019.

(51) Int. Cl.
*G10L 15/26* (2006.01)
*G06F 16/9032* (2019.01)
*G06Q 30/06* (2012.01)

(52) U.S. Cl.
CPC ... *G06F 16/90332* (2019.01); *G06Q 30/0625* (2013.01); *G10L 15/26* (2013.01)

(58) Field of Classification Search
None
See application file for complete search history.

(56) References Cited

U.S. PATENT DOCUMENTS

| 4,482,976 | A  | * | 11/1984 | Ishikawa | G07G 1/12 704/258 |
| 7,533,040 | B2 | * | 5/2009 | Perkowski | G06Q 30/0625 705/26.4 |

(Continued)

OTHER PUBLICATIONS

PCT; App. No. PCT/US2020/029801; International Search Report and Written Opinion dated Jul. 17, 2020.

*Primary Examiner* — Neeraj Sharma
(74) *Attorney, Agent, or Firm* — Fitch, Even, Tabin & Flannery, LLP

(57) ABSTRACT

In some embodiments, methods and systems are provided for processing information requests of workers at a retail facility and retrieving information associated with the retail facility based on the information requests. An electronic device permits a worker at the retail facility to input an information request in association with at least one worker at the retail facility or at least one product at the retail facility. A computing device receives, from the electronic device, electronic data representative of a scope of the information request, analyzes this electronic data to determine the scope of the information request, obtain relevant information from one or more databases, and transmits the (Continued)

obtained information to the electronic device, which in turn outputs the information to the worker.

18 Claims, 8 Drawing Sheets

(56) References Cited

U.S. PATENT DOCUMENTS

| | | | | |
|---|---|---|---|---|
| 8,640,946 | B1* | 2/2014 | Block | G06Q 20/308 |
| | | | | 235/379 |
| 10,318,569 | B1* | 6/2019 | Funk | G06F 16/381 |
| 10,380,669 | B2* | 8/2019 | Narayanan | G06F 16/951 |
| 10,691,747 | B2* | 6/2020 | Bakir | G06F 16/90332 |
| 2005/0043953 | A1* | 2/2005 | Winterkamp | G10L 15/22 |
| | | | | 704/E15.04 |
| 2005/0144187 | A1* | 6/2005 | Che | G10L 15/22 |
| | | | | 704/E15.044 |
| 2010/0030668 | A1 | 2/2010 | Paben | |
| 2012/0095881 | A1* | 4/2012 | Rothman | G06Q 30/0643 |
| | | | | 705/27.2 |
| 2013/0144785 | A1* | 6/2013 | Karpenko | G06Q 20/425 |
| | | | | 705/44 |
| 2014/0344116 | A1 | 11/2014 | Paracha | |
| 2016/0117593 | A1 | 4/2016 | London | |
| 2016/0210602 | A1* | 7/2016 | Siddique | G06Q 20/321 |
| 2017/0132627 | A1 | 5/2017 | Phillips | |
| 2017/0359718 | A1* | 12/2017 | Denny | H04L 9/0861 |
| 2018/0018973 | A1* | 1/2018 | Moreno | G10L 17/08 |
| 2018/0365624 | A1 | 12/2018 | Pati | |
| 2019/0042185 | A1 | 2/2019 | Young | |

* cited by examiner

SYSTEMS AND METHODS FOR PROCESSING RETAIL FACILITY-RELATED INFORMATION REQUESTS OF RETAIL FACILITY WORKERS

CROSS-REFERENCE TO RELATED APPLICATION

This application claims the benefit of U.S. Provisional Application No. 62/840,991, filed Apr. 30, 2019, which is incorporated herein by reference in its entirety.

TECHNICAL FIELD

This invention relates generally to processing user queries input into an electronic device and, in particular, to processing information requests of workers at a retail facility and retrieving information associated with the retail facility based on the information requests.

BACKGROUND

A typical large-size retail store may employ hundreds of workers and stock thousands of products. On a daily basis, workers at the retail store may have to deal with various questions pertaining to worker tasks and product inventory at the retail store and look for answers. Often, a worker has to walk to various offices or sections of the sales floor, or to consult with other workers, or to operate several computing devices linked to different databases just to answer a few questions pertaining to store operation, worker tasks, and/or product inventory. Such systems are time consuming due to the many manual steps involved and are subject to human error.

BRIEF DESCRIPTION OF THE DRAWINGS

Disclosed herein are embodiments of systems, apparatuses, methods, and systems pertaining to processing information requests of workers at a retail facility and retrieving information associated with the retail facility based on the information requests. This description includes drawings, wherein.

Figure 1:
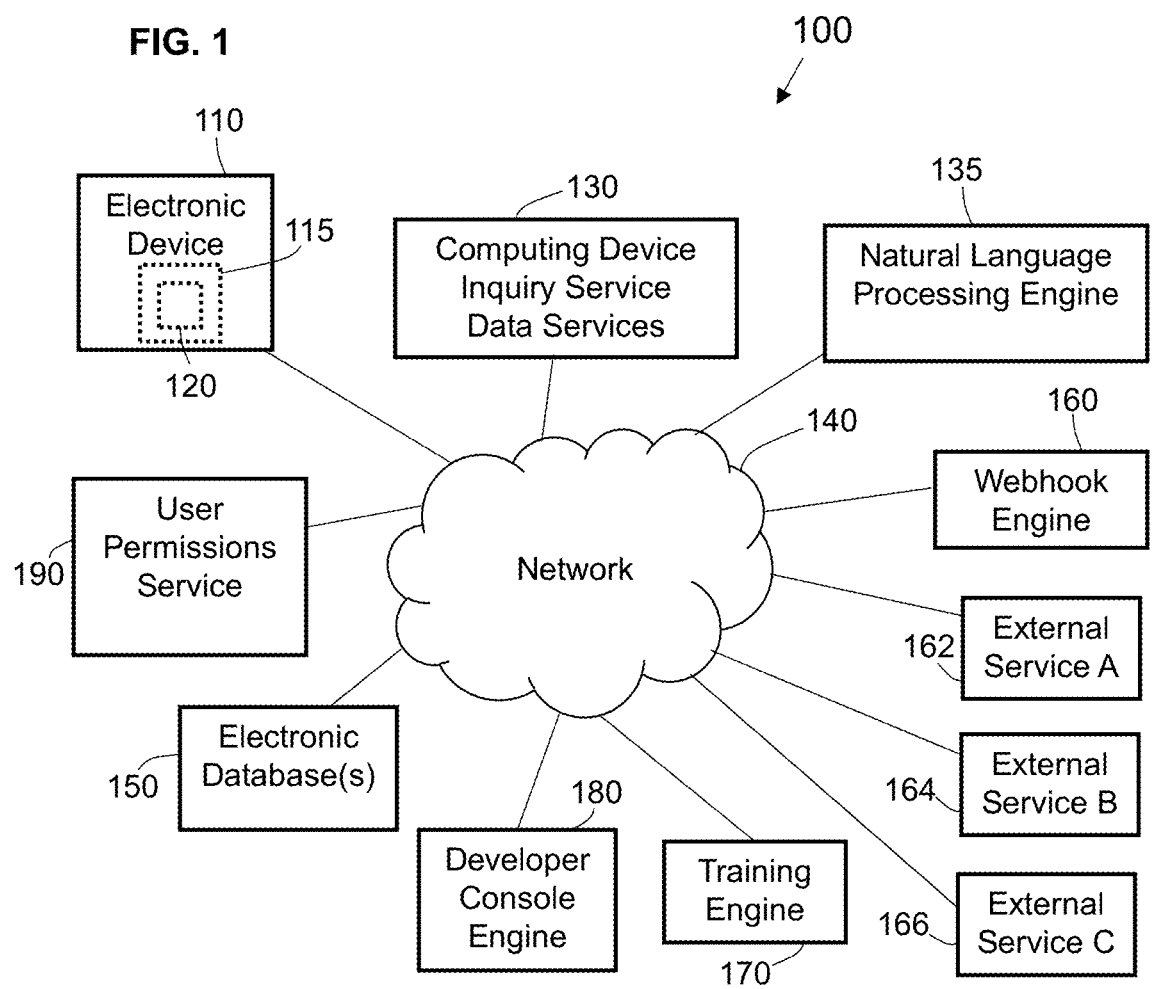
FIG. 1 is a diagram of a system of processing information requests of workers at a retail facility and retrieving information associated with the retail facility based on the information requests in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for processing information requests of workers at a retail facility and retrieving information associated with the retail facility based on the information requests. An electronic device permits a worker at the retail facility to input an information request in association with at least one worker at the retail facility or at least one product at the retail facility. A computing device receives, from the electronic device, electronic data representative of a scope of the information request, analyzes this electronic data to determine the scope of the information request, obtain relevant information from one or more databases, and transmits the obtained information to the electronic device, which in turn outputs the information to the worker.

In some embodiments, a system for processing information requests of workers at a retail facility and retrieving information associated with the retail facility based on the information requests comprises an electronic device configured to permit a worker at the retail facility to input an information request in association with at least one worker at the retail facility or at least one product at the retail facility. The electronic device includes at least one input device configured to permit the worker to input the information request via at least one of voice input, keyboard input, and touchscreen input. The system further includes a computing device including a processor-based control circuit and configured for communication with the electronic device over a network. The system further includes a plurality of electronic databases in communication over a network with the computing device. The electronic databases are configured to: store electronic data associated with the at least one worker at the retail facility or the at least one product at the retail facility; and receive a query for a portion of the electronic data from the computing device based on the information request input into the electronic device by the worker. The computing device is configured for communication with the electronic databases over the network. The control circuit of the computing device is configured to: receive, from the electronic device and in response to the information request input into the electronic device by the worker, electronic data representative of a scope of the information request; analyze the electronic data received from the electronic device to determine the scope of the information request; obtain, from at least one of the electronic databases, and based on the determined scope of the information request, a portion of the electronic data associated with the at least one worker at the retail facility or the at least one product at the retail facility; and transmit a signal to the electronic device, the signal including the portion of the electronic data retrieved from the at least one of the databases by the computing device based on the determined scope of the information request. In response to receipt of the signal from the computing device, the electronic device is configured to output, to the worker, the portion of the electronic data retrieved from the at least one of the databases by the computing device based on the determined scope of the information request.

In other embodiments, a method for processing information requests of workers at a retail facility and retrieving information associated with the retail facility based on the information requests comprising: providing an electronic device configured to permit a worker at the retail facility to input an information request in association with at least one worker at the retail facility or at least one product at the retail facility, the electronic device including at least one input device configured to permit the worker to input the information request via at least one of voice input, keyboard input, and touchscreen input; providing a computing device including a processor-based control circuit and configured for communication with the electronic device over a network; providing a plurality of electronic databases in communication over a network with the computing device, each of the electronic databases configured to: store electronic data associated with the at least one worker at the retail facility or the at least one product at the retail facility; and receive a query for a portion of the electronic data from the computing device based on the information request input into the electronic device by the worker; receiving, via the control circuit of the computing device and from the electronic device, and in response to the information request input into the electronic device by the worker, electronic data representative of a scope of the information request; analyzing, via the control circuit of the computing device, the electronic data received from the electronic device to determine the scope of the information request; obtaining, from at least one of the electronic databases, and based on the determined scope of the information request, a portion of the electronic data associated with the at least one worker at the retail facility or the at least one product at the retail facility; transmitting a signal to the electronic device, the signal including the portion of the electronic data retrieved from the at least one of the databases by the computing device based on the determined scope of the information request; and in response to receipt of the signal from the computing device, outputting to the worker, via the electronic device, the portion of the electronic data retrieved from the at least one of the databases by the computing device based on the determined scope of the information request.

FIG. 1 shows an embodiment of a system 100 for processing information requests of workers at a retail facility and retrieving information associated with the retail facility based on the information requests. A retail facility or retail store will be understood to mean any entity operating as a brick-and-mortar physical store and/or product storage/distribution facility and/or a website accessible, for example, via the internet or another network, by way of which products may be ordered by customers. A customer will be understood as an individual or a business entity. Exemplary products that may be stocked at and sold by a retail store may include, but are not limited to, general-purpose consumer goods, as well as consumable products, such as medications, food items, and dietary supplements.

The exemplary system 100 depicted in FIG. 1 includes a user electronic device 110, which may be a stationary, portable, and/or hand-held electronic device, for example, a desktop computer, a laptop computer, a tablet, a mobile phone, or any other electronic, processor-based device that may be configured for data entry and communication with the other components of the system 100, which will be described in more detail below. In some embodiments, the electronic device 110 includes an input device (e.g., microphone, keyboard (physical or graphical), a touchscreen, etc.) that permits a worker at the retail facility to input the workers information request via voice, keyboard, touchscreen, or other input. Generally, as will be described in more detail below, the workers information request may relate to information related to operation of the retail facility, including information associated with the workers at the retail facility, as well as the products being stocked and sold at the retail facility.

In some embodiments, the worker is permitted to input his/her request via a graphical user interface 115 displayed to the worker on the electronic device 110. The graphical interface 115 may include one or more graphical input fields, menu options, and/or sub-interfaces that permit the worker to activate one of the input devices (e.g., a microphone) that enable the worker to input his/her information request. In some aspects, the graphical interface 115 may be a retailer-associated mobile application (app) installed on the electronic device 110 and configured to display various above-described menu options, notifications, and/or alerts for the worker. In some embodiments, the graphical interface 115 generated by the electronic device 110 may include a first graphical interface configured to permit the worker to input the information request via the worker-selected input device and a second graphical interface configured to display the output indicating the information responsive to the information request.

In the embodiment illustrated in FIG. 1, the electronic device 110 is configured to permit the user to input his/her information request via natural language (i.e., by speaking), and the electronic device 110 is coupled to a natural language application programming interface (API) 120 configured to receive and translate the information request input by the worker via voice input into electronic voice data representative of the information request. In some aspects, the natural language application programming interface 120 may include a Speech API and a Translate API. In certain aspects, in response to receiving an input (e.g., voice, keyboard, touchscreen, etc.) comprising an information request by the worker, the electronic device 110 is configured to transmit a signal including electronic voice data representative of the information request over the network 140 to the computing device 130, which will be described in more detail below.

In the embodiment illustrated in FIG. 1, the system 100 includes a computing device 130, which may be implemented as one computer/server at one retail facility, or as multiple interconnected computers/servers stored at multiple facilities operated by or for the retailer, or as a virtual computing device. In some embodiments, the computing device 130 is a stationary or portable electronic device, for example, a desktop computer, a laptop computer, a tablet, a mobile phone, or any other electronic device including a processor-based control circuit (i.e., control unit). In the embodiment of FIG. 1, the computing device 130 is configured for data entry and processing as well as for communication with other devices of system 100 via a network 140.

The network 140 may be a wide-area network (WAN), a local area network (LAN), a personal area network (PAN), a wireless local area network (WLAN), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 (e.g., electronic database 150, which may be one database or a collection of a plurality of databases) may include cloud-based features, such as cloud-based memory storage. In some embodiments, as will be described below and shown in FIG. 1, the computing device 130 is configured to access multiple electronic databases 150 and communicate with the electronic device 110 or other electronic devices and/or databases and/or services/engines (e.g., natural language processing engine 135, webhook engine 160, external service A 162, external service B 164, external service C 166, training engine 170, developer console engine 180, etc.) over the network 140 to facilitate the processing of information requests of workers entered via the electronic device 110.

In the exemplary embodiment illustrated in FIG. 1, the computing device 130 is in two-way communication over the network 140 with electronic database 150 (which may be one or more electronic databases, which may include cloud storage, and which may be coupled to one or more services) that is configured to store electronic data associated with workers and products at the retail facility. In some embodiments, the electronic database 150 is configured to store electronic data that is associated with the following information and/or services: product service, recipe service, fresh forecast service, product layout service, retail facility working hours service, retail facility address service, retail facility phone service, historical sales data associated with the retail facility, key performance indicators associated with the retail facility, membership income associated with the retail facility, credit card applications associated with the retail facility, wages of the workers at the retail sales facility, perpetual inventory at the retail sales facility, productivity metrics associated with the retail sales facility, expenses associated with the retail sales facility, compliance metrics associated with the retail facility, customer feedback associated with the retail sales facility, human resources service, work attendance service, retail facility membership service, and retail facility worker service. Notably, these services may represent electronic information retrievable by the computing device 130 and/or may represent electronic information that is obtained by one or more computing devices in communication with the electronic database 150 and/or computing device 130. Some of these services are described below.

In some aspects, a schedule service represents retrievable information associated with who (e.g., a list of workers) is working at the retail store, where (which department) they are working at the retail store, what times they are working (i.e., their schedule), and their position (e.g., manager, cashier, stocking associate, etc.) In some aspects, a product service represents retrievable information associated with products carried at the retail store or available on a website associated with the retail store. In some aspects, the information includes but is not limited to: a list of items carried by the retail store; whether a product is in stock at the retail store; how many units of a given product are available at the retail store; price of a product at the retail store; status (e.g., on order, in-stock, sold, etc.) of a product at the retail store item, whether the product is on-sale/discount at the retail store and/or the original and discounted price of the product; physical location(s) of the product at the retail store, other retail stores of the retailer that have a given product in stock and number of units and per unit price.

In some aspects, a recipe service represents retrievable information representing specifications and videos about products that are made at a retail store (e.g., how to cut meat, make meal solutions, bake products, etc.) In some aspects, a fresh forecast service represents retrievable information representing forecasts how much of a given product (e.g., rotisserie chickens, French baguettes, etc.) to make on a given day, or how much of a given product is left from a preceding day, and minimum presentation quantity for a given product. In some aspects, a layout service represents retrievable information associated with layouts (e.g., planograms) that let workers at the retail store how and where merchandise should be positioned within the retail store. In some aspects, club hours service, club phone service, and club address service, may represent retrievable information associated with the working hours (including holidays) of a retail store (and specific departments within the retail store), all phone numbers associated with the retail store, and the physical address of the retail store.

In some aspects, a sales service represents retrievable information associated with sales figures (e.g., total sales over a given time period) for the retail store in general or by department. In some aspects, an HR/Attendance service represents retrievable information associated with human resources (HR) policies and guidelines and various attendance metrics for each worker. In some aspects, a membership service represents retrievable information associated with subscribed members of the retail store, including the type of membership and whether the membership is current or expired. In some aspects, an associate service represents retrievable information associated with employment status of each of the workers at the retail store, including whether the workers are full time, part time, etc.

In the exemplary embodiment illustrated in FIG. 1, a worker at a retail facility is permitted to accesses the computing device 130 over the network 140 via an electronic device 110. The electronic device 110 usable by the worker may be a stationary, portable, and/or hand-held electronic device, for example, a desktop computer, a laptop computer, a tablet, a mobile phone, or any other electronic, processor-based device configured for data entry and communication with the computing device 130 over the network 140.

In some aspects, the system includes a user permissions service 190 (which may be separate from the computing device 130 or incorporated into the computing device), and when a worker at the retail facility uses the electronic device 110 to submit an information request over the network 140 to the computing device 130, the user permissions service may request a verification of the identity (e.g., username/password, employee number, etc.) of the worker of the electronic device 110. The user permissions service 190 may then verify the identity of the worker (e.g., by comparing the username/password data entered by the user against username/password data (associated with workers of the retail facility) stored in the electronic database 150. In one aspect, after the worker attempting to operate the electronic device 110 is verified, and the worker's level of access to information is verified, the computing device 130 retrieves information from the electronic database 150 based on the worker's information request and in accordance with the worker's verified information access level.

As mentioned above, the graphical interface 115 may include one or more graphical input fields, menu options, and/or sub-interfaces that permit the worker to activate one of the input devices (e.g., a microphone) that enable the worker to input his/her information request. In some aspects, as will be described further below, in response to receipt, from the electronic device 110 over the network 140, of electronic data representative of a scope of the information request by the worker, the computing device 130 is configured to analyze the received electronic data, obtain data relevant to the information request from the electronic database 150, and transmit a signal to the electronic device 110 that includes the electronic data retrieved from the electronic database 150 by the electronic device 110 based on the determined scope of the information request. Again, as will be discussed in more detail below, in response to this signal, the electronic device 110 is configured to output (e.g., via a speaker or a display screen) the information to the worker.

In some embodiments, the system 100 includes one or more localized Internet-of-Things (IoT) devices and controllers in communication with the computing device 130. As a result, in some embodiments, the localized IoT devices and controllers can perform most, if not all, of the computational load and associated monitoring that would otherwise be performed by the computing device 130, and then later asynchronous uploading of summary data can be performed by a designated one of the IoT devices to the computing device 130, or a server remote to the computing device 130. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the computing device 130 or a server remote to the computing device 130.

In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI may be discarded depending upon the degree to which such KRI has any value based on local processing and evaluation of such KM. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data.

Figure 2:
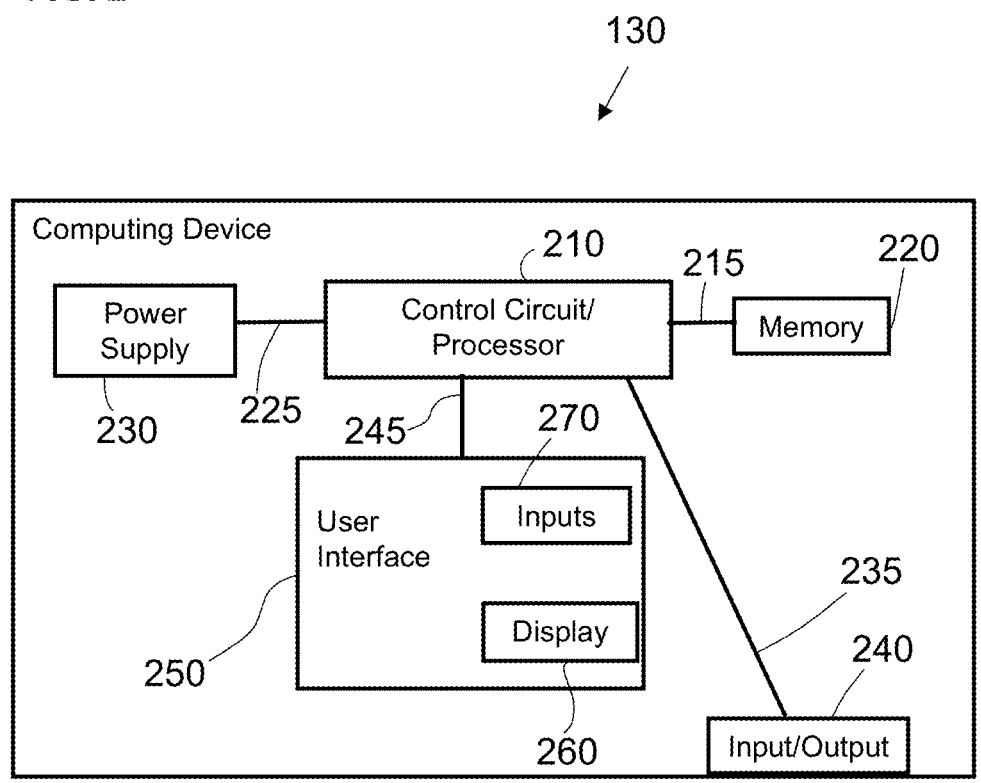
FIG. 2 is a functional diagram of an exemplary computing device usable with the system of FIG. 1 in accordance with some embodiments.

With reference to FIG. 2, an exemplary computing device 130 configured for use with the systems and methods described herein may include a programmable control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 210 of the computing device 130 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control circuit may be referred to as a non-transitory medium or non-transitory computer readable medium.

The control circuit 210 of the computing device 130 is also electrically coupled via a connection 235 to an input/output 240 that can receive signals from electronic devices in communication over the network 140 with the computing device 130 (e.g., information request obtained by the computing device 130 from the electronic device 110, electronic data obtained by the computing device 130 from the electronic database 150, etc.), or from any other source that can communicate with the computing device 130 via a wired or wireless connection. The input/output 240 of the computing device 130 can also send signals to electronic devices in communication over the network 140 with the computing device 130 (e.g., to send a query for data to the electronic database 150, and/or to send the data retrieved from the electronic database 150 to the electronic device 110), or to any other source that can communicate with the computing device 130 via a wired or wireless connection).

In the embodiment shown in FIG. 2, the processor-based control circuit 210 of the computing device 130 is electrically coupled via a connection 245 to a user interface 250, which may include a visual display or display screen 260 (e.g., LED screen) and/or button input 270 that provide the user interface 250 with the ability to permit an operator of the computing device 130 to manually control the computing device 130 by inputting commands via touch-screen and/or button operation and/or voice commands to, for example, invoke the developer console engine 180 (which may be used by a user to program the processor of the control circuit 210 to perform new functions), or to invoke the training engine 170 (which may be used by a user to train the processor of the control circuit 210 to identify new intents and entities in the natural language data representing the workers' information requests). It will be appreciated that the performance of such functions by the computing device 130 of the computing device 130 is not dependent on a human operator, and that the control circuit 210 may be programmed to perform such functions without a human operator.

In some embodiments, the display screen 260 of the computing device 130 is configured to display various graphical interface-based menus, options, and/or alerts that may be transmitted to the computing device 130 and displayed on the display screen 260 in connection with various aspects of the information requests submitted by the workers via electronic device 110 at the retail store. It will be appreciated that the display screen 260 of the computing device 130 may be configured as both a display screen and an input 270 (e.g., a touch-screen that permits an operator to press on the display screen 260 to enter text and/or execute commands.)

As discussed above, in some aspects, after the worker inputs his/her information request into the electronic device 110, and after the electronic device 110 transmits electronic data representative of a scope of the information request to the computing device 130, the processor of the control circuit 210 of the computing device 130 the computing device 130 is configured to receive, from the electronic device 11 and in response to the information request input into the electronic device by the worker, electronic data representative of a scope of the information request. In some embodiments, the control circuit 210 is coupled to at least one application programming interface (API) that is configured to receive the signal including the electronic voice data representative of the information request from the electronic device 110 over the network 140.

In the embodiment of FIG. 1, the control circuit is coupled to a natural language processing engine 135, which may be implemented as a device separate from the computing device 130, or as a component incorporated into the physical structure of the computing device 130. In certain aspects, in response to receipt of the electronic voice data from the electronic device 110, the natural language processing engine 135 is configured to analyze the received electronic voice data to extract the electronic data representative of the scope of the information request.

In some embodiments, the processor of the control circuit 210 is programmed to analyze the electronic data received from the electronic device 110 to determine the scope of the information request. In some embodiments, the electronic data representative of the scope of the information request extracted from the electronic voice data received at the computing device 130 from the electronic device 110 includes intent data indicative of a subject of the information request by the worker and entity data indicative of an object of the information request by the worker. For example, in certain aspects, the processor of the control circuit 210 is programmed to determine the intent of the worker (ex: worker wants to look up a schedule, worker wants to look up a recipe, worker wants to look up price of a product), as well as to determine the entity/entities within the request (e.g., names of workers, names of dishes for which recipes are sought, names of products for which price is sought, etc.) In one example, when the information request (verbally input or typed in by the worker into the electronic device 110) is "when is Bob working tomorrow," the processor of the control circuit 210 interprets this information request to understand that the intent is to look up a schedule, and that the entities that provide context to the worker's question are Bob (a name of a worker) and tomorrow (the timeframe of the schedule).

Some additional examples of information requests input by workers of the retail facility and the responsive outputs by the system 100 on the electronic device 110 of the worker are illustrated in FIGS. 4-7. In some embodiments, the information requests 113 illustrated in FIGS. 4-7 can be input via pressing a graphical button 117 to activate a microphone of the electronic device 110, followed by a natural language (i.e., voice) input by the worker. In some embodiments, the information requests 113 illustrated in FIGS. 4-7 can be input via pressing a graphical button 119 to activate a graphical keyboard of the electronic device 110, followed by the worker using his/her fingers to type in a text input via the graphical keyboard. While ach of the responsive outputs in FIGS. 4-7 is depicted within a graphical interface 115 generated on a display 112 of the electronic device 110, it will be appreciated that these responsive outputs may be audible responses generated via a speaker of the electronic device 110.

Figure 4:
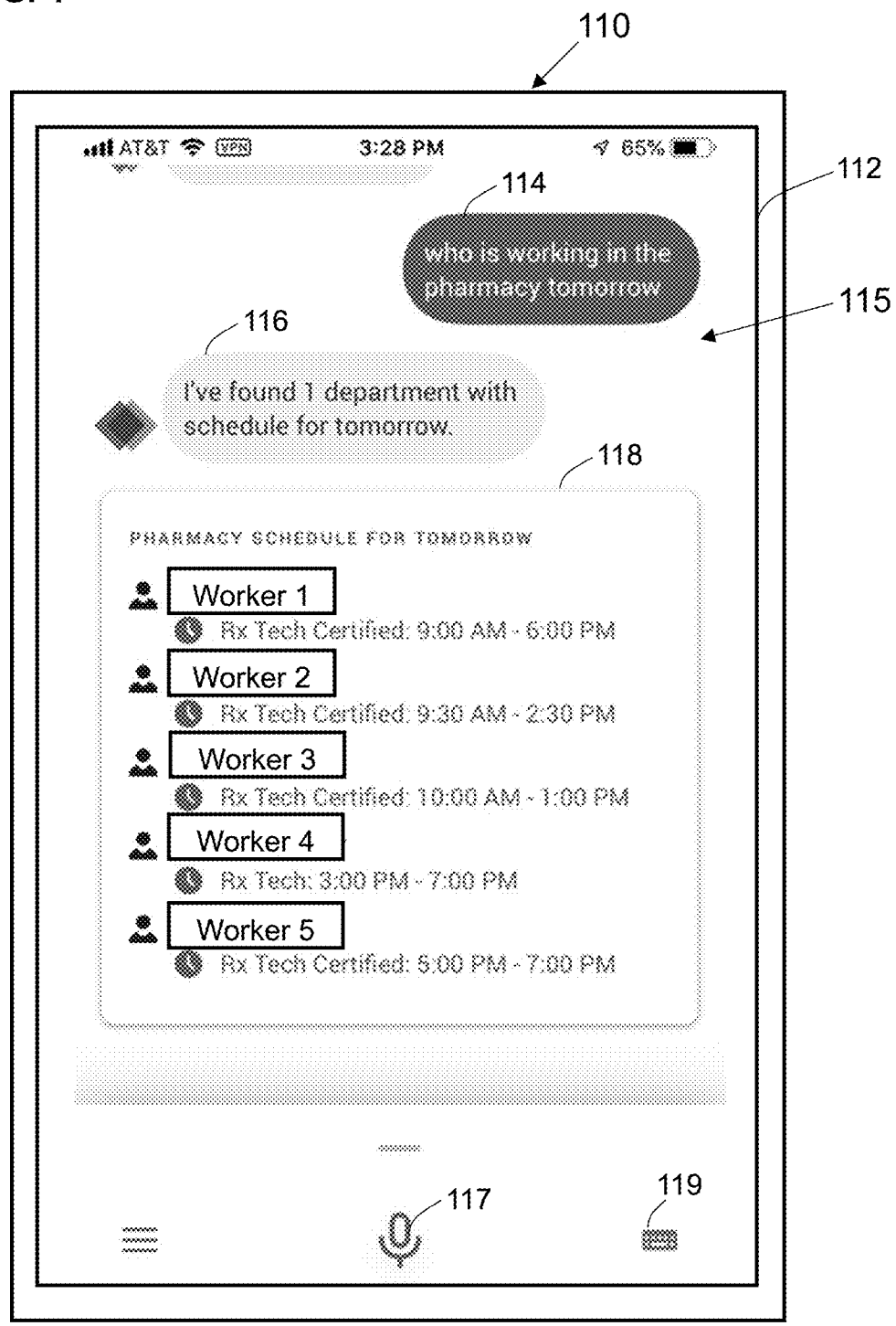
FIG. 4 is a screen shot of an exemplary electronic device, showing a graphical interface of the electronic device depicting an exemplary information request by a worker and an exemplary output responsive to the worker's information request.

In the example shown in FIG. 4, the worker uses the electronic device to input (e.g., via voice or text) an information request 114 that relates to other workers at the retail facility and asks "who is working in the pharmacy tomorrow," in response to which the electronic device 110 generates the following exemplary general output 116 within the graphical interface 115 on the display 112 of the electronic device: "I've found 1 department with schedule for tomorrow." In the example shown in FIG. 4, in addition to the general output 116, an additional output 118 is generated within the graphical interface that lists the schedules (i.e., hours to be worked) of five identified workers (i.e., Worker 1, Worker 2, Worker 3, Worker 4, and Worker 5).

Figure 5:
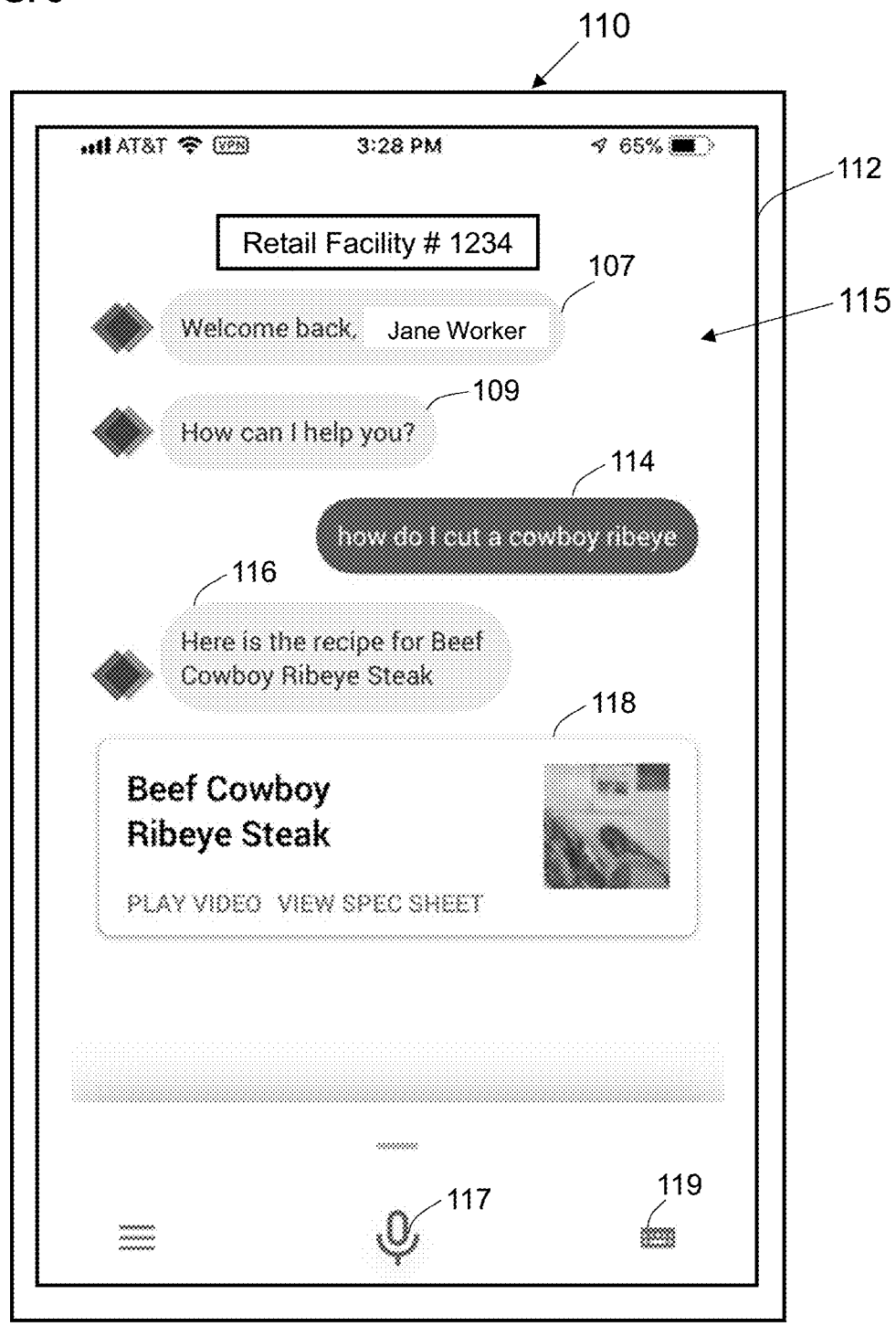
FIG. 5 is a screen shot of an exemplary electronic device, showing a graphical interface of the electronic device depicting another exemplary information request by a worker and an exemplary output responsive to the worker's information request.

In the example shown in FIG. 5, the electronic device 110 generates two greetings for the worker accessing the system 100, namely, a first greeting 107 that greets the worker by name (i.e., "Welcome back, Jane Worker"), and a second greeting 109 that asks the worker to indicate the information request (i.e., "How can I help you?"). In the example shown in FIG. 5, the worker uses the electronic device to input (e.g., via voice or text) an information request 114 relating to recipes that asks "how do I cut a cowboy ribeye," in response to which the electronic device 110 generates the following exemplary general output 116 within the graphical interface 115 on the display 112 of the electronic device: "Here is the recipe for Beef Cowboy Ribeye Steak." In the example shown in FIG. 5, in addition to the general output 116, an additional output 118 is generated within the graphical interface that includes more detailed information (e.g., video and spec sheet) pertaining to the recipe for Beef Cowboy Ribeye Steak the worker inquired about.

Figure 6:
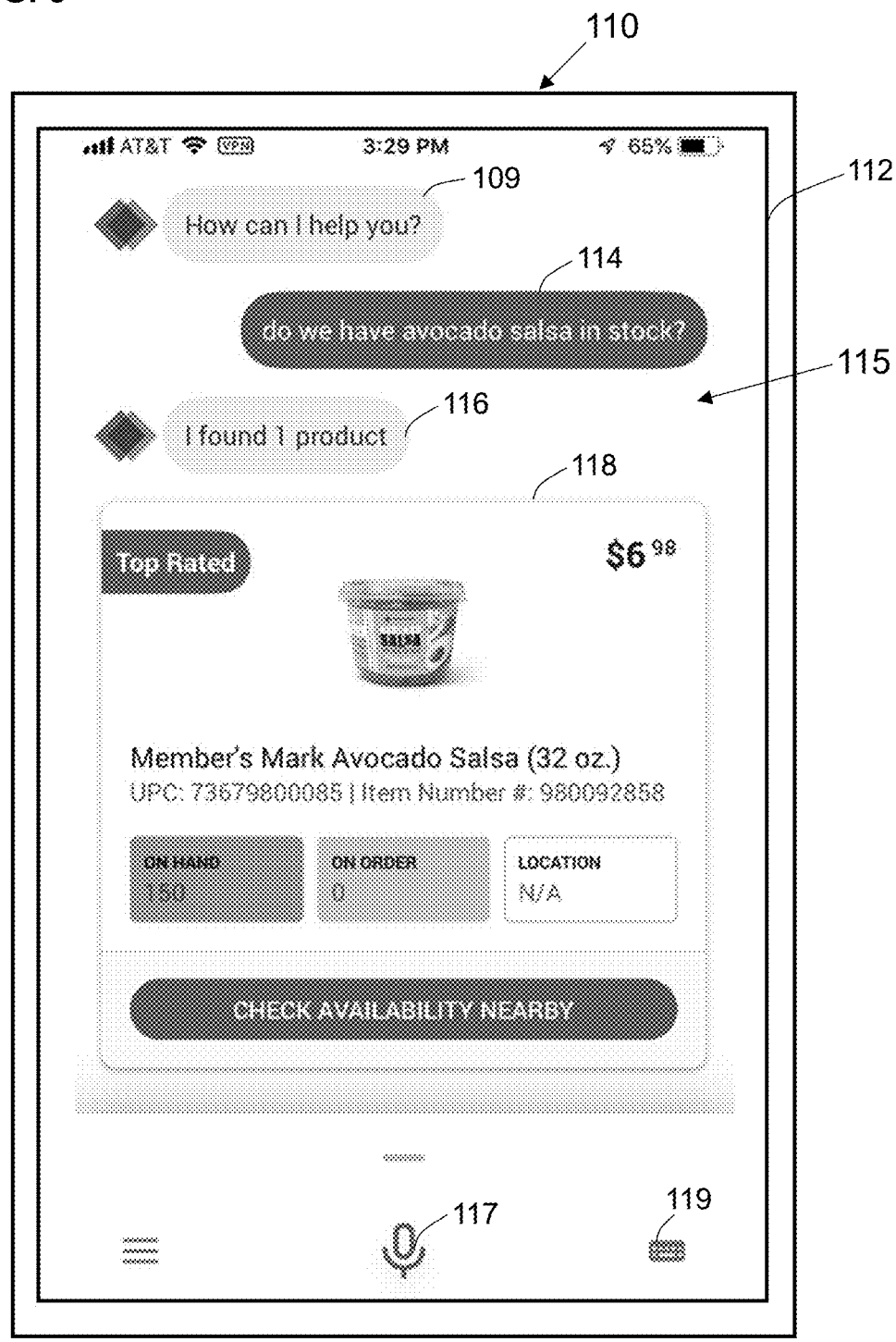
FIG. 6 is a screen shot of an exemplary electronic device, showing a graphical interface of the electronic device depicting yet another exemplary information request by a worker and an exemplary output responsive to the worker's information request.

In the example shown in FIG. 6, the electronic device 110 generates a single greeting for the worker accessing the system 100, namely, the greeting 109 that asks the worker to indicate the information request (i.e., "How can I help you?"). In the example shown in FIG. 6, the worker uses the electronic device to input (e.g., via voice or text) an information request 114 relating to product inventory that asks "do we have avocado salsa in stock?," in response to which the electronic device 110 generates the following exemplary general output 116 within the graphical interface 115 on the display 112 of the electronic device: "I found 1 product." In the example shown in FIG. 6, in addition to the general output 116, an additional output 118 is generated within the graphical interface that includes more detailed information (e.g., an image of the product, the price of the product, the name of the product, the size of the product, the UPC and Item Numbers associated with the product, the number of units of the product on-hand (150 in FIG. 6), the number of units of the product on order (0 in FIG. 6), and the location of the product (N/A in FIG. 6)) pertaining to the product at the retail facility the worker inquired about.

Figure 7:
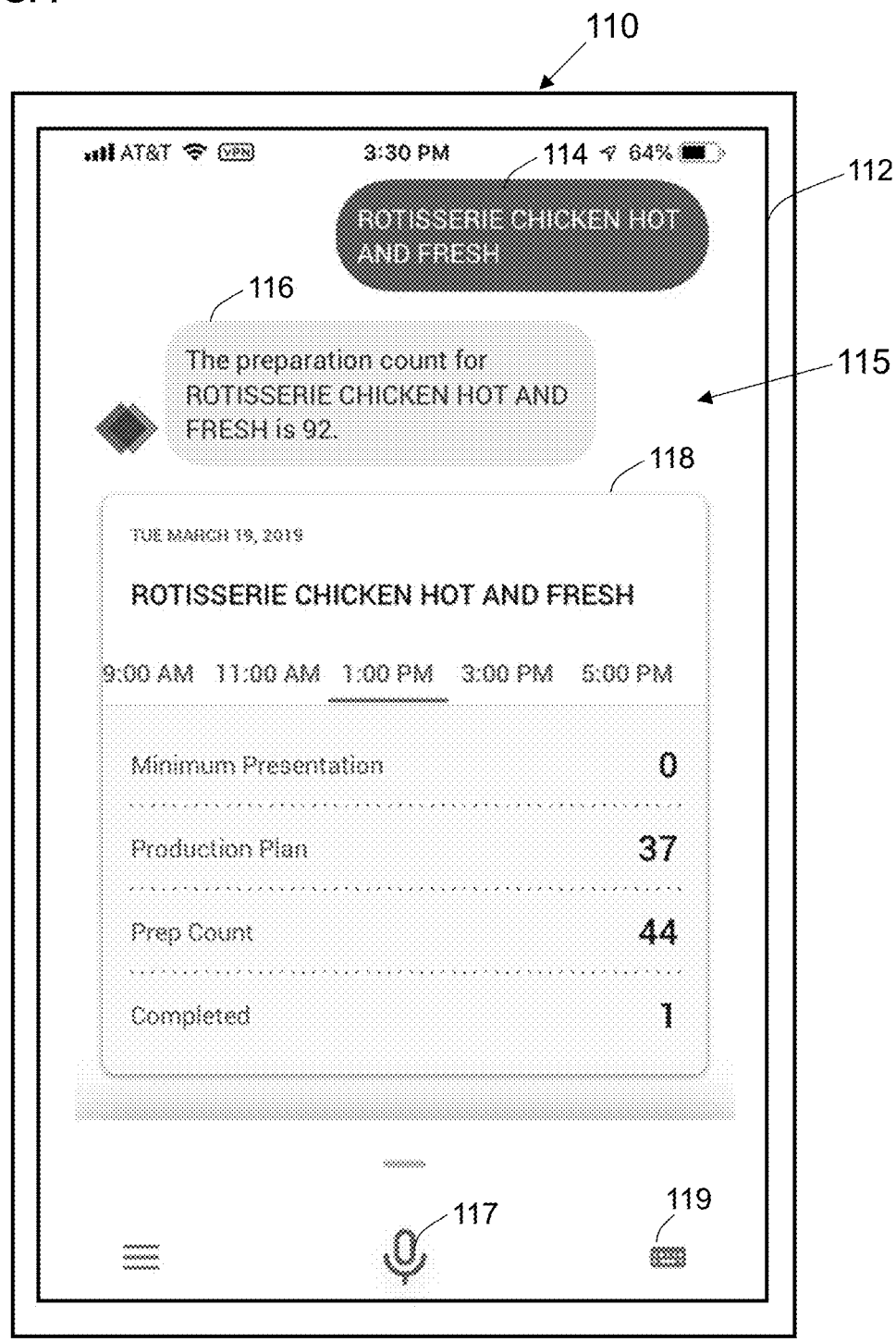
FIG. 7 is a screen shot of an exemplary electronic device, showing a graphical interface of the electronic device depicting still another exemplary information request by a worker and an exemplary output responsive to the worker's information request.

In the example shown in FIG. 7, the worker uses the electronic device to input (e.g., via voice or text) an information request 114 relating to a preparation count for a specific deli product (i.e., rotisserie chicken) that is not in the form of a question, but simply states "rotisserie chicken hot and fresh," in response to which the electronic device 110 generates the following exemplary general output 116 within the graphical interface 115 on the display 112 of the electronic device: "The preparation count for Rotisserie Chicken Hot and Fresh is 92." In the example shown in FIG. 7, in addition to the general output 116, an additional output 118 is generated within the graphical interface that includes more detailed information (e.g., today's date, name of product (Rotisserie Chicken Hot and Fresh), times of day, production plan (37) at a given time of day for the product, prep count (44) for the product, and number of product preparations completed (1)) pertaining to the product at the retail facility the worker inquired about.

In certain embodiments, the control circuit 210 of the computing device 130 is coupled to a training engine 170 configured to permit a user of the computing device to program the processor of the control circuit with additional natural language recognition capabilities. For example, in some aspects, the training engine 170 is configured to permit a user to train the machine learning models programmed into the control circuit and/or the machine learning models used by the Natural Language Processing service to identify additional intents and entities identified in the information requests submitted by workers via the electronic device 110.

In some aspects, the training engine 170 may be employed to train the processor of the control circuit 210 to recognize information requests pertaining to various departments within the retail facility by way of training the processor to recognize entities such as names of departments (e.g., pharmacy, grocery, deli, home goods, toys, sporting goods, etc.). This way, when the information request of the worker is "who is working in the pharmacy tomorrow," the processor of the control circuit 210 of the computing device 130 is able to recognize that the intent and entities being inquired by the worker about relate to the pharmacy department of the retail store. In certain aspects, the training engine 170 may be employed to train the processor of the control circuit 210 to recognize the intent of the information request based on a wide variety of information requests. For example, while the straight-forward question of "what is the recipe for . . . " would be easily recognizable as a query for a recipe, the processor of the control circuit 210 may be trained to pull up recipes from the electronic database 150 (and/or external services A, B, C, etc.) in response to questions such as "how do I make . . . " or "how do I cut . . . " or "how do I prepare . . . " or "what ingredients are needed to make . . . ." As such, the training engine 170 enables the processor of the control circuit 210 of the computing device 130 to be trained to recognize a wide variety of intents and entities, thereby avoiding having the workers rephrase their information requests until they are able to ask a question that the computing device 130 recognizes, thereby increasing the efficiency of response time of the system 100 to a wide variety of worker information requests.

In some embodiments, the control circuit 210 of the computing device 130 is coupled to a developer console engine 180 configured to permit a user of the computing device to program the processor of the control circuit 210 of the computing device 130 with additional functions (e.g., additional search features and/or services). For example, in some aspects, the developer console engine 180 may be operated to program the processor of the control circuit 210 of the computing device 130 with the ability to recognize questions relating to traffic conditions around the retail facility, including but not limited to, questions regarding the number of parking spaces open in the retail facility's parking lot, questions regarding directions to the store from a given location (including up to date traffic information), etc. In another example, in some aspects, the developer console engine 180 may be operated to program the processor of the control circuit 210 of the computing device 130 with the ability to recognize questions relating to deliveries to the retail facility including, but not limited questions regarding scheduled product delivery times, real-time updates regarding certain delivery vehicles, number of units of a given product being delivered in a given delivery, etc. As such, the developer console engine 180 enables the processor of the control circuit 210 of the computing device 130 to be a more comprehensive solution for a wider variety of information requests that may be of interest to workers at a retail facility.

In some aspects, after analyzing the electronic data received from the electronic device 110 to determine the scope of the information request by the worker, the processor of the control circuit 210 is programmed to obtain, from the electronic database 150 (which, as mentioned above, could be a plurality of databases and/or services coupled to databases), and based on the determined scope of the information request, a portion of the electronic data stored in the electronic database 150 that is relevant to the worker's information request. The retrieved electronic data may represent information associated with one or more workers at the retail facility and/or information associated with one or more products at the retail facility. In some aspects, in order to retrieve information relevant to the information request input by the worker, the computing device 130 may engage a webhook engine 160 (webhook service), which in turn may be coupled to a plurality of data sources, for example external service A 162, external service B 164, external service C 166, or the like. To that end, in some embodiments, the control circuit 210 of the computing device 130 is coupled to a webhook engine (which may be external to the computing device 130 or internal to the computing device 130) configured to communicate with one or more databases 150, and based on the determined scope of the information request, obtain the portion of the electronic data relevant to the worker's information request.

In some embodiments, after the processor of the control circuit 210 obtains a portion of the electronic data stored in the electronic database 150 that is relevant to the worker's information request, the processor of the control circuit 210 is programmed to cause the computing device 130 to transmit a signal to the electronic device 110, and this signal includes the portion of the electronic data retrieved from the database 150 by the computing device 130 based on the determined scope (e.g., intent and entity) of the information request. Then, in response to receipt of such a signal from the computing device 130, the electronic device 110 is configured to output (e.g., via a speaker or an electronic display) the portion of the electronic data retrieved from the database 150 by the computing device based on the determined scope of the information request.

Figure 3:
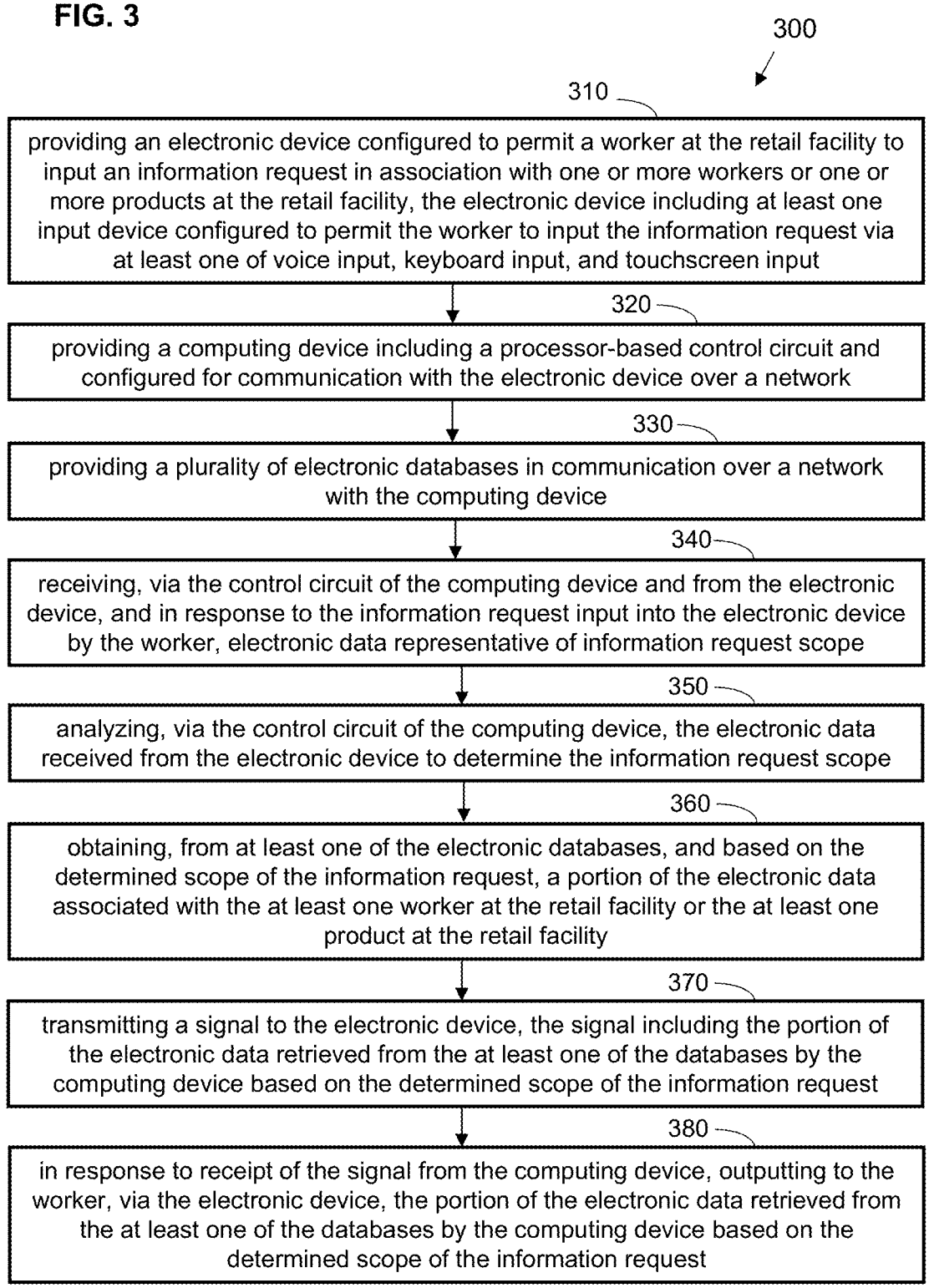
FIG. 3 is a flow chart diagram of a process of processing information requests of workers at a retail facility and retrieving information associated with the retail facility based on the information requests in accordance with some embodiments.

FIG. 3 shows an embodiment of an exemplary method 300 of processing information requests of workers at a retail facility and retrieving information associated with the retail facility based on the information requests. The illustrated method 300 includes providing an electronic device 110 including at least one input device configured to permit a worker at a retail facility to input an information request in association with one or more workers or one or more products at the retail facility via at least one of voice input, keyboard input, and touchscreen input (step 310). As discussed above, the electronic device 110 may be configured to generate one or more graphical interfaces configured to permit the worker to input the worker's information request, and may include a microphone configured to permit the worker to input a verbal information request, or a physical or on-screen keyboard configured to permit the worker input a typed-in request. In addition, as discussed above, the electronic device 110 may be coupled to a speech recognition module/API that translates the information request input by the worker via voice input into electronic voice data representative of the information request. In some aspects, as discussed above, the electronic device 110 transmits a signal including the electronic voice data representative of the information request to the computing device 130 over the network 140.

In the embodiment illustrated in FIG. 3, the exemplary method 300 further includes providing a computing device 130 including a processor-based control circuit 210 and configured for communication with the electronic device 110 over the network 140 (step 320) and providing a plurality of electronic databases 150 in communication over a network 140 with the computing device 130 (step 330). As discussed above, the electronic databases 150 may be implemented as a large number of separate databases and/or cloud storage and/or services coupled to databases, and/or one consolidated database. In some embodiments, each of the electronic databases 150 stores electronic data associated with workers of the retail facility, worker tasks at the retail facility, and products stocked and/or sold at the retail facility. In addition, in some embodiments, each of the electronic databases 150 receives a query for a portion of the electronic data stored thereon from the computing device 130 based on the information request input into the electronic device 110 by the worker, in order to facilitate extraction, by the computing device 130, of electronic data from the electronic database 150 relevant to the worker's information request.

With further reference to FIG. 3, in response to the information request input into the electronic device 110 by the worker, the method 300 further includes receiving, via the control circuit 210 of the computing device 130 and from the electronic device 110, electronic data representative of a scope of the information request (step 340), and analyzing, via the control circuit 210 of the computing device 130, the electronic data received from the electronic device 110 to determine the information request scope (step 350). As discussed above, in some aspects, the electronic data representative of the scope of the information requests transmitted from the electronic device to the computing device 130 includes intent data indicative of a subject (schedule, pharmacy department, do we have X in stock, etc.) of the information request by the worker and entity data (names of workers, working hours, name of product) indicative of an object of the information request by the worker.

In some embodiments, the method may include providing at least one application programming interface coupled to the control circuit 210 of the computing device 130 to enable the computing device 130 to receive the signal including the electronic voice data representative of the information request from the electronic device 110 over the network 140. In some aspects, the method further includes providing a natural language processing engine 135 coupled to the control circuit 210, which facilitates the analysis of the electronic voice data received by the computing device 130 from the electronic device 110 to extract the electronic data representative of the scope of the information request.

After the control circuit 210 of the computing device 130 analyzes the electronic data representative of the information request and determines the intent and entity associated with the information request, the processor of the control circuit 210 causes the computing device 130 to obtain information responsive to the information request from the electronic database 150. To that end, the method illustrated in FIG. 3 includes obtaining, from at least one of the electronic databases 150, and based on the determined scope of the information request, a portion of the electronic data associated with the at least one worker at the retail facility or the at least one product at the retail facility (step 360). As discussed above, the electronic database 150 may be a collection of databases accessible directly by the computing device 130 and/or indirectly via the webhook engine 160 and/or via one or more external services 162, 164, 166.

In some aspects, after determining the intent and entity of the information request (e.g., "which workers (entity) are working in the pharmacy (entity) tomorrow (entity)?>get schedule (intent)"), the control circuit 210 causes the computing device 130 to transmit a query to the electronic database 150 in order to extract information from the electronic database 150 that is related to the schedule of the pharmacy department and the names of the workers scheduled to work on the date representing tomorrow. After the computing device 130 obtains this data from the electronic database 150, the illustrated exemplary method 300 includes transmitting a signal to the electronic device 110, the signal including the portion of the electronic data retrieved from the database(s) 150 by the computing device 130 based on the determined scope of the information request (step 370). In the form illustrated in FIG. 3 in response to receipt of the signal from the computing device 130, the method 300 includes outputting to the worker, via the electronic device 110, the portion of the electronic data retrieved from the database(s) 150 by the computing device 130 based on the determined scope of the information request (step 380). This data may be displayed to the worker within a graphical interface 115 of the electronic device 110, or output to the worker via a speaker of the electronic device 110, thereby providing a visible or audible response to the workers information request on a variety of topics related to the retail facility, as discussed above.

Figure 8:
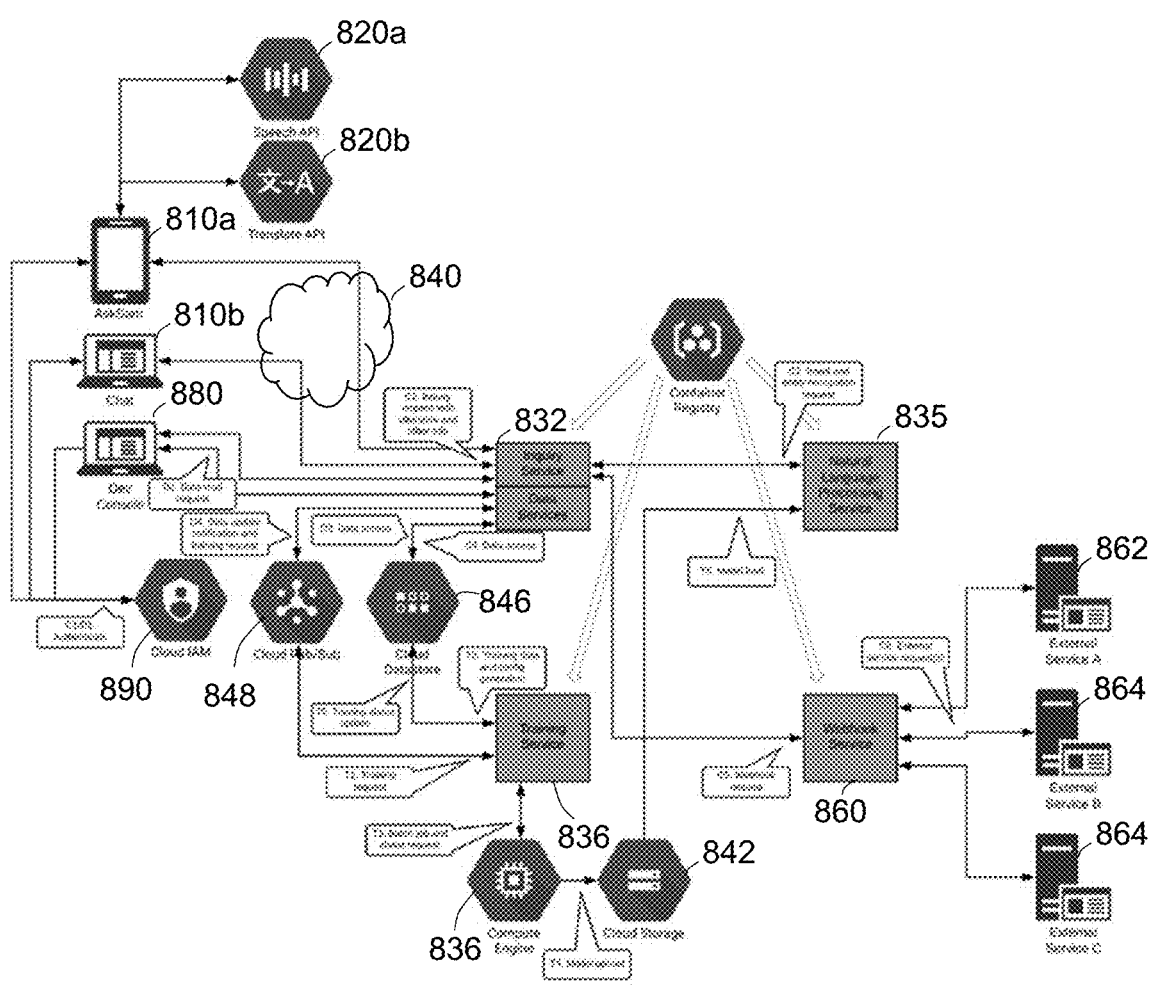
FIG. 8 is a diagram of a system of processing information requests of workers at a retail facility and retrieving information associated with the retail facility based on the information requests in accordance with some embodiments.

FIG. 8 illustrates an exemplary system 800 for according to some embodiments. In the exemplary system 800 of FIG. 8, the worker is permitted to enter the worker's request via a voice-input enabled device 810a and/or a text-input enabled device 110b. In some aspects, the voice-input enabled device 810a is coupled to a natural language programming interface (API) that includes a Speech API 820a and a Translate API 820b that facilitate the intake and processing of the worker's voice input by the electronic device 810a.

In some embodiments, after a worker inputs his/her voice-based information request (i.e., the phrase uttered by the worker into a microphone of the electronic device 810a) and the speech recognition module APIs 820b translates the information request input by the worker via voice input into electronic voice data representative of the information request, the electronic device 810a transmits a signal including the electronic voice data representative of the information request to an inquiry service 832 over the network 840. In the embodiment illustrated in FIG. 8, the inquiry service 832 (which relates to interpreting the worker's information request and outputting electronic data representing information responsive to the information request) is coupled to data services 834 (which relates to the databases and data supporting the information request interpretation function of the inquiry service 832). The inquiry service 832 may be implemented as one computer/server at one retail facility, or as multiple interconnected computers/servers stored at multiple facilities operated by or for the retailer.

In the embodiment of FIG. 8, the inquiry service is coupled to a natural language processing service 835 configured to analyze the electronic voice data received at the inquiry service from the electronic device 810a to extract the electronic data representative of the scope of the information request by the worker. In the embodiment shown in FIG. 8, the natural language processing service is coupled to cloud storage 842 (which may be implemented as one or more physical hard drives), which may be used to store a database of phrases/words representative of possible information requests by workers, and which is in turn coupled to a compute engine 836, which may be used to generate and upload new phrases/words representative of possible information requests by workers to the cloud storage 842.

In some aspects, the electronic data representative of the scope of the information requests extracted by the natural language processing service 835 includes intent data indicative of a subject (schedule, pharmacy department, do we have X in stock, etc.) of the information request by the worker and entity data (names of workers, working hours, name of product) indicative of an object of the information request by the worker. In the exemplary method 800 of FIG. 8, after the intent and entity associated with the information request are determined, the inquiry, the inquiry service 832 generates a webhook requests configured to obtain electronic data representing information relevant to the intent and entity extracted from the information request, and transmits the webhook request to a webhook service 860, which then obtain the portion of the electronic data relevant to the worker's information request. In the exemplary embodiment of FIG. 8, the webhook service 860 is coupled to three data sources, namely, external service A 862, external service B 864, external service C 866. While only three external services are shown in FIG. 8 for simplicity, it will be appreciated that the webhook service 860 may be coupled to a large number of services (both internet-based and intranet-based) that enable the webhook service 860 to obtain the portion of the electronic data relevant to the worker's information request.

In some embodiments, after the inquiry service 832 obtains the electronic data responsive to the worker's information request via the webhook service 860, the inquiry service 832 transmits a signal to the electronic device 810a, and this signal includes the electronic data retrieved via the webhook service 860 based on the inquiry service-determined scope (e.g., intent and entity) of the information request. In some aspects, in response to receipt of such a signal from the inquiry service 832, the electronic device 810a outputs the electronic data retrieved by the inquiry service 832 via the webhook service 860 based on the determined scope of the information request. The output data may be displayed to the worker within a graphical interface of the electronic device 810a, or output to the worker via a speaker of the electronic device 810a, thereby providing a visible or audible response to the workers information request on a variety of topics related to the retail facility, as discussed above.

In the embodiment depicted in FIG. 8, the system 800 includes a developer console 880 configured to permit an operator to add additional functions (e.g., additional search features and/or search services) to the inquiry service 832 and/or data services 834. As mentioned above, in some aspects, the developer console 880 may be operated to add features pertaining to traffic to data services 834, such that the inquiry service 832 will be enabled to recognize questions relating to traffic conditions around the retail facility, including but not limited to, questions regarding the number of parking spaces open in the retail facility's parking lot, questions regarding directions to the store from a given location (including up to date traffic information), etc.

In the embodiment depicted in FIG. 8, each of electronic device 810a, 810b and developer console 880 are coupled to Cloud Identity and Access Management (IAM) 890, which is a user permissions service 190 configured to request a verification of the identity (e.g., username/password, employee number, etc.) of the worker attempting to operate electronic device 810a, 810b, or developer console 880, and to verify the identity of the worker (e.g., by comparing the username/password data entered by the user against username/password data (associated with workers of the retail facility) stored in the Cloud IAM 890. In one aspect, after the worker is verified, and the worker's level of access to information is verified, the worker has access to information and functions in accordance with the worker's verified information access level.

In the embodiment depicted in FIG. 8, the system 800 includes a training service 870 configured to permit a user of the computing device to program additional natural language recognition capabilities into the data services 834, thereby expanding the abilities and increasing response time of the inquiry service 832. In some aspects, the training service 870 permits an operator to add further data to the data services 834 to enable the inquiry service 832 to identify additional intents and entities identified in the information requests submitted by workers via the electronic devices 810a and 810b.

In the embodiment illustrated in FIG. 8, the training service 870 and the data services 834 are both coupled to a Cloud Pub/Sub 848, which facilitates transmission of electronic data (e.g., data sent as part of data access by data services 834, data sent as part of training request, etc.) between the training service 870 and data services 834. In the embodiment illustrated in FIG. 8, the training service 870 and the data services 834 are also coupled to a Cloud DataStore 846, which provides data storage for the additional data (e.g., training data updates, configuration data updates, etc.) generated via the training service 870), as well as for retrieval of that additional data by the data services 834 In the embodiment illustrated in FIG. 8, the training service 870 is further coupled to a compute engine 836, which is configurable for batch job and status requests, as well as for uploading natural language recognition models to cloud storage 842, thereby enabling the natural language processing service 835 to extract updated natural language recognition models from cloud storage 842 in response to requests from inquiry service 832.

In some aspects, the training engine 170 may be employed to train the processor of the control circuit 210 to recognize information requests pertaining to various departments within the retail facility by way of training the processor to recognize entities such as names of departments (e.g., pharmacy, grocery, deli, home goods, toys, sporting goods, etc.). This way, when the information request of the worker is "who is working in the pharmacy tomorrow," the processor of the control circuit 210 of the computing device 130 is able to recognize that the entity being inquired by the worker about is the pharmacy department of the retail store. In certain aspects, the training engine 170 may be employed to train the processor of the control circuit 210 to recognize the intent of the information request based on a wide variety of information requests. For example, while the straight-forward question of "what is the recipe for . . . " would be easily recognizable as a query for a recipe, the processor of the control circuit 210 may be trained to pull up recipes from the electronic database 150 (and/or external services A, B, C, etc.) in response to questions such as "how do I make . . . " or "how do I cut . . . " or "how do I prepare . . . " or "what ingredients are needed to make . . . ." As such, the training engine 170 enables the processor of the control circuit 210 of the computing device 130 to be trained to recognize a wide variety of intents and entities, thereby avoiding having the workers rephrase their information requests until they are able to ask a question that the computing device 130 recognizes, thereby increasing the efficiency of response time of the system 100 to a wide variety of worker information requests.

The systems and methods described herein advantageously enable workers to obtain answers to a variety of retail facility-operation and inventory management queries related to the retail facility without having to engage in a series of inefficient and time-consuming steps. As a result, such systems and methods provide a significant increase in efficiency of providing information to workers, thereby reducing the time workers would otherwise spend on obtaining this information, and thereby advantageously providing significant operation cost savings to the retailer operating the retail facility.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for processing information requests of workers at a retail facility and retrieving information associated with the retail facility based on the information requests, the system comprising:
    an electronic device that permits a worker at the retail facility to input an information request in association with at least one worker at the retail facility or at least one product at the retail facility, the electronic device being configured to generate a graphical interface that outputs a greeting to the worker, the greeting prompting the worker to respond to the greeting by inputting into the graphical interface, via at least one input device configured for at least one of voice input, keyboard input, and touchscreen input, the information request into a fillable text field in a form of a text-based question or a statement that causes the graphical interface to display a response to the question or the statement input by the worker into the fillable text field;
    a computing device including a processor-based control circuit and configured for communication with the electronic device over a network;
    a plurality of electronic databases in communication over a network with the computing device, each of the electronic databases configured to:
        store electronic data associated with the at least one worker at the retail facility or the at least one product at the retail facility; and
        receive a query for a portion of the electronic data from the computing device based on the information request input into the electronic device by the worker;
    wherein the computing device is configured for communication with the electronic databases over the network, and the control circuit of the computing device is configured to:
        receive, from the electronic device and in response to the information request input into the electronic device by the worker, electronic data representative of a scope of the information request;
        analyze the electronic data received from the electronic device to determine the scope of the information request;
        obtain, from at least one of the electronic databases, and based on the determined scope of the information request, a portion of the electronic data associated with the at least one worker at the retail facility or the at least one product at the retail facility;
        transmit a signal to the electronic device, the signal including the portion of the electronic data retrieved from the at least one of the databases by the computing device based on the determined scope of the information request;
    wherein, in response to receipt of the signal from the computing device, the electronic device is configured to output, to the worker, the portion of the electronic data retrieved from the at least one of the databases by the computing device based on the determined scope of the information request.

2. The system of claim 1, wherein:
    the electronic device is coupled to a natural language application programming interface configured to translate the information request input by the worker via voice input into electronic voice data representative of the information request; and
    the electronic device is configured to transmit a signal including the electronic voice data representative of the information request to the computing device over the network.

3. The system of claim 2, wherein the control circuit is coupled to at least one application programming interface configured to receive the signal including the electronic voice data representative of the information request from the electronic device over the network.

4. The system of claim 2, wherein:
the control circuit is coupled to a natural language processing engine; and
in response to receipt of the electronic voice data from the electronic device, the natural language processing engine is configured to analyze the received electronic voice data to extract the electronic data representative of the scope of the information request.

5. The system of claim 4, wherein the electronic data representative of the scope of the information request extracted from the received electronic voice data includes intent data indicative of a subject of the information request by the worker and entity data indicative of an object of the information request by the worker.

6. The system of claim 4 wherein the control circuit is coupled to a training engine configured to permit a user of the computing device to program the processor of the control circuit with additional natural language recognition capabilities.

7. The system of claim 1, wherein the control circuit is coupled to at least one worker permissions service configured to determine whether the worker is authorized to receive the portion of the electronic data retrieved from the at least one of the databases by the computing device based on the determined scope of the information request.

8. The system of claim 1, wherein the control circuit is coupled to a webhook engine configured to, communicate with the at least one of the electronic databases, and based on the determined scope of the information request, obtain the portion of the electronic data associated with the at least one worker at the retail facility or the at least one product at the retail facility.

9. The system of claim 1, wherein at least one of the electronic databases is configured to store electronic data associated with at least one of: product service, recipe service, fresh forecast service, product layout service, retail facility working hours service, retail facility address service, retail facility phone service, historical sales data associated with the retail facility, key performance indicators associated with the retail facility, membership income associated with the retail facility, credit card applications associated with the retail facility, wages of the workers at the retail sales facility, perpetual inventory at the retail sales facility, productivity metrics associated with the retail sales facility, expenses associated with the retail sales facility, compliance metrics associated with the retail facility, customer feedback associated with the retail sales facility, human resources service, work attendance service, retail facility membership service, and retail facility worker service.

10. A method for processing information requests of workers at a retail facility and retrieving information associated with the retail facility based on the information requests, the method comprising:
providing an electronic device configured to permit a worker at the retail facility to input an information request in association with at least one worker at the retail facility or at least one product at the retail facility,
generating, on a display of the electronic device, a graphical interface that outputs a greeting to the worker, the greeting prompting the worker to respond to the greeting by inputting into the graphical interface, via at least one input device configured for at least one of voice input, keyboard input, and touchscreen input the information request into a fillable text field in a form of a text-based question or a statement that causes the graphical interface to display a response to the question or the statement input by the worker into the fillable text field;
providing a computing device including a processor-based control circuit and configured for communication with the electronic device over a network;
providing a plurality of electronic databases in communication over a network with the computing device, each of the electronic databases configured to:
store electronic data associated with the at least one worker at the retail facility or the at least one product at the retail facility; and
receive a query for a portion of the electronic data from the computing device based on the information request input into the electronic device by the worker;
receiving, via the control circuit of the computing device and from the electronic device, and in response to the information request input into the electronic device by the worker, electronic data representative of a scope of the information request;
analyzing, via the control circuit of the computing device, the electronic data received from the electronic device to determine the scope of the information request;
obtaining, from at least one of the electronic databases, and based on the determined scope of the information request, a portion of the electronic data associated with the at least one worker at the retail facility or the at least one product at the retail facility;
transmitting a signal to the electronic device, the signal including the portion of the electronic data retrieved from the at least one of the databases by the computing device based on the determined scope of the information request;
in response to receipt of the signal from the computing device, outputting to the worker, via the electronic device, the portion of the electronic data retrieved from the at least one of the databases by the computing device based on the determined scope of the information request.

11. The method of claim 10, further comprising:
providing a natural language application programming interface coupled to the electronic device and configured to translate the information request input by the worker via voice input into electronic voice data representative of the information request; and
transmitting, via the electronic device, a signal including the electronic voice data representative of the information request to the computing device over the network.

12. The method of claim 11, further comprising providing at least one application programming interface coupled to the control circuit and configured to receive the signal including the electronic voice data representative of the information request from the electronic device over the network.

13. The method of claim 11, wherein:
further comprising providing a natural language processing engine coupled to the control circuit; and
in response to receipt of the electronic voice data from the electronic device, analyzing, via the natural language processing engine, the received electronic voice data to extract the electronic data representative of the scope of the information request.

14. The method of claim 13, wherein the electronic data representative of the scope of the information request extracted from the received electronic voice data includes intent data indicative of a subject of the information request by the worker and entity data indicative of an object of the information request by the worker.

15. The method of claim 13, further providing a training engine coupled to the control circuit and configured to permit a user of the computing device to program the processor of the control circuit with additional natural language recognition capabilities.

16. The method of claim 10, further comprising providing at least one worker permissions service coupled to the control circuit and configured to determine whether the worker is authorized to receive the portion of the electronic data retrieved from the at least one of the databases by the computing device based on the determined scope of the information request.

17. The method of claim 10, further comprising providing a webhook engine coupled to the control circuit and configured to, communicate with the at least one of the electronic databases, and based on the determined scope of the information request, obtain the portion of the electronic data associated with the at least one worker at the retail facility or the at least one product at the retail facility.

18. The method of claim 10, further comprising storing, on the at least one of the electronic database, electronic data associated with at least one of: product service, recipe service, fresh forecast service, product layout service, retail facility working hours service, retail facility address service, retail facility phone service, historical sales data associated with the retail facility, key performance indicators associated with the retail facility, membership income associated with the retail facility, credit card applications associated with the retail facility, wages of the workers at the retail sales facility, perpetual inventory at the retail sales facility, productivity metrics associated with the retail sales facility, expenses associated with the retail sales facility, compliance metrics associated with the retail facility, customer feedback associated with the retail sales facility, human resources service, work attendance service, retail facility membership service, and retail facility worker service.

* * * * *